United States Patent
Rameau et al.

(10) Patent No.: US 6,920,401 B2
(45) Date of Patent: Jul. 19, 2005

(54) APPARATUSES AND METHODS FOR DELIVERING LIQUID CHEMICAL PRODUCTS

(75) Inventors: Guillaume Rameau, Grenoble (FR); Pascal Mengolli, Echirolles (FR)

(73) Assignee: L'Air Liquide-Societe Anonyme a'Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/648,527

(22) Filed: Aug. 26, 2003

(65) Prior Publication Data

US 2004/0078152 A1 Apr. 22, 2004

(30) Foreign Application Priority Data

Aug. 29, 2002 (FR) .......................................... 02 10712

(51) Int. Cl.$^7$ .............................................. G01F 23/00
(52) U.S. Cl. .......................... 702/55; 702/100; 702/101
(58) Field of Search ................................ 702/101, 102, 702/23, 24, 25, 26, 55, 100; 222/137, 141, 402.1, 402.2; 60/204, 211

(56) References Cited

U.S. PATENT DOCUMENTS

| | | | | |
|---|---|---|---|---|
| 4,013,195 A | * | 3/1977 | Ferris | 222/95 |
| 4,843,876 A | | 7/1989 | Holm | |
| 5,499,656 A | * | 3/1996 | Stotelmyer et al. | 137/583 |
| 5,636,513 A | * | 6/1997 | Pahl | 60/204 |

FOREIGN PATENT DOCUMENTS

| | | |
|---|---|---|
| JP | 2000 338115 A | 12/2000 |
| WO | WO 02 04899 | 1/2002 |

OTHER PUBLICATIONS

French Search Report to FR 02 10712.

* cited by examiner

*Primary Examiner*—Bryan Bui
(74) *Attorney, Agent, or Firm*—Linda K. Russell

(57) ABSTRACT

A method and an apparatus for measuring the amount of liquid in a container, and for causing the liquid to flow from the container to a point of use. The weight of the container is measured at several time intervals to determine the weight change of the liquid contained within. When the weight change is less than a predetermined fraction of either the weight of container weight and/or of the liquid originally contained in the container, a signal is generated to indicate that the container may be empty.

11 Claims, 3 Drawing Sheets

APPARATUSES AND METHODS FOR DELIVERING LIQUID CHEMICAL PRODUCTS

BACKGROUND

The present invention relates to apparatuses and methods for delivering liquid chemical products. It relates more particularly to a method for measuring the amount of liquid present in a container to which means for making said liquid flow from said container to a point of use are in particular connected, in which method the weight $P_i$ of liquid in the container is measured at a time $t_i$, i varying from 0 to n, this measurement being repeated at time $t_{i+1}$, then at time $t_{i+2}$, until time $t_n$ (where n is an integer greater than 3).

In the fabrication of semiconductors during which a succession of conducting, semiconducting or dielectric layers (possibly having different dielectric constants) is deposited on a substrate or wafer, generally made of silicon, the deposition operations being carried out selectively through layers for masking (partially) certain surfaces, it is becoming increasingly frequent to produce these layers by bringing chemical liquids called "precursors" to the desired points on the surface, said liquids reacting, under the temperature and pressure conditions created in the reactor in which the wafer or wafers are placed, with other products also introduced into the reactor, such as for example gases. Thus, for example, it is common practice at the present time to create SiC or SiOC dielectric layers using a precursor such as tetramethylsilane (4MS), dimethyldimethoxysilane (DMDMOS) or TMCTS. These precursors are chemical products in liquid form under standard temperature and pressure conditions.

Such precursors have a very high added value and are generally supplied in small containers (volume up to 20 liters typically). These source containers conventionally feed one or more containers that ensure delivery to the customer's equipment. For cost reasons, it is critical to optimize the use of the precursor contained in the source container so as to limit any financial loss associated with returning to the supplier a container that still contains the product. The choice of technique for measuring the amount remaining in the source container is therefore of primary importance.

Many techniques are known at the present time for determining the presence of liquid in a container, with greater or lesser accuracy. In general, the following techniques may be mentioned:

- detection by absolute measurement of the weight: this method relies exclusively on the reliability of the weight measuring apparatus, which it is well known is not optimal;
- detection by a float within a conical inner container in its lower part, possibly coupled to a weight measurement: this method brings the measuring apparatus into contact with the precursor, with the associated contamination and corrosion risks; in addition, it does not allow optimum use of the product;
- ultrasonic detection in the delivery line at the outlet of the container, possibly coupled to a weight measurement: this method allows all of the product contained in the container to be used, but it does require a fine adjustment of the instrumentation, which has the drawback of depending on the nature of the product; moreover, the use of this method represents a considerable additional cost; and
- detection by a capacitive or optical sensor: these methods require fittings on the drum containing the products, such as an inspection window or a lateral inspection tube.

However, all these well-known methods have in general one point in common: they do not allow the chemical product to be used practically down to its last drop.

This is because the cost of the liquid chemical products used hitherto has not necessarily justified the presence of sophisticated means for saving a few grams of products and generally the use of a balance has proved to be sufficient with all the inaccuracies in weight associated, for example, with the variable weight of the container itself, even when the container is supposed to be identical, and the very relative accuracy of balances that support weights of several tens of kilograms.

SUMMARY

The method according to the invention makes it possible to solve the drawbacks of the prior art and provides a simple, inexpensive and reliable solution for determining the amount of liquid chemical product remaining in the container.

The method according to the invention is one in which the weight change $\Delta P_i = P_i - P_{i+1}$ of liquid between times $t_i$ and $t_{i+1}$ is also measured so as to generate at time $t_n$ a signal S indicating that the container may be considered as being empty when $\Delta P_i$ is less than a predetermined fraction of the weight of the container and/or of the liquid initially contained in the latter (i varying from 0 to n; n will be defined in such a way that the time $t_n$ at which the (n+1)th $\Delta P_i$ measurement sampling occurs is the time at which it will have been determined for the first time that $\Delta P_i$ is less than said predetermined fraction of the weight of the container and/or of the liquid contained in the latter, the value of which fraction is set in advance).

Preferably, the measurement of the weight change $\Delta P_i$ is triggered only when the value of the direct or indirect measurement of the weight of the container and/or of the liquid is less than or equal to a predetermined fraction F of the initial weight of the container and/or of the liquid contained in the container. In general, it will be preferable for the predetermined fraction F to be less than or equal to about 10% of the weight of liquid initially contained in the container (or of the weight of the container and of the liquid initially contained in the container).

Throughout the description of the present invention, reference will be made in general to the weight $P_i$ of liquid in the container, that is to say to the weight of liquid remaining in the container at time $t_i$. The initial weight of liquid (with or without the weight of the container itself) is the weight of liquid when the container (also called the "shuttle drum") has just been changed. At time $t_0$ at which the sampling starts, the weight $P_0$ will not, in general, be the initial weight of liquid (but a lower value).

Of course, as a general rule the total weight of the container, that is to say the weight of the envelope itself plus the total weight of the contents, will be measured at two successive times $t_i$ and $t_{i+1}$. This measurement is equivalent to the measurement of the weight change of the liquid in the container between these two successive times, all other things being equal. A person skilled in the art will make the necessary modifications to the measurement so that, whatever the actual measurement made, the change in this measurement is equivalent to the change in the weight of liquid in the container.

According to a variant of the invention, the time interval between two successive measurements (at times $t_i$ and $t_{i+1}$) of the weight of the container and/or of the liquid is predetermined, preferably about 10 seconds.

Preferably, the flow of the liquid is at least partly caused by the pressure exerted by a pressurized gas lying above the surface of the liquid in the container, said gas having a purity compatible with that of the liquid. This gas will essentially be a gas that is inert with respect to the liquid to be propelled. The term "compatible purity" is understood to mean a purity such that it will not increase the concentration of impurities in the liquid (particles or species such as $H_2O$, solvents, etc.). Furthermore, said gas, the pressure of which expels the liquid from the container, must preferably have the lowest possible solubility in the chemical liquid to be propelled. A person skilled in the art will in general be able rapidly to determine, from the literature or by simple tests, the solubility of the abovementioned gases in the liquid to be propelled. As a general rule, it is helium (having what is called an "electronic" purity in order thus to fulfill the above criterion) that will be best suited.

According to a variant of the invention, the liquid is sent to a second container before being sent to its point of use.

In general, the propellant gas is a gas chosen from nitrogen, carbon dioxide, argon, krypton, xenon and/or helium (as a preference, helium will in general be chosen); the gas preferably has a pressure between $10^5$ and $10^6$ pascals. Although in general the propellant gas is in gas form and stored under pressure in a container such as a bottle, it is possible in certain cases to envision supplying the gas initially in liquid form, for example liquid nitrogen and/or argon, which, because of their vaporization above the liquid precursor, will cause the necessary pressurization.

The invention also relates to an apparatus for delivering a liquid chemical product, comprising a container that contains the chemical liquid to be delivered, means for connecting this container to a point of use where the liquid product has to be delivered, and means for measuring the amount of liquid in said container, which also includes clock means so as to generate, at successive times $t_i$, $t_{i+1}$ etc., a signal for triggering a measurement $P_i$, $P_{i+1}$, etc. of the amount of said chemical liquid in said container at said times $t_i$, $t_{i+1}$ etc, storage means for recording the measurements $P_i$, $P_{i+1}$, etc. of the amount of said liquid at times $t_i$, $t_{i+1}$, etc. respectively, means for calculating the difference in the amount of liquid $\Delta P_i = P_i - P_{i+1}$ in the container between times $t_i$ and $t_{i+1}$, means for comparing $\Delta P_i$ with a predetermined value F and means for generating a first signal $S_1$ if $\Delta P_i > F$ or a second signal $S_2$ if $\Delta P_i \leq F$.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
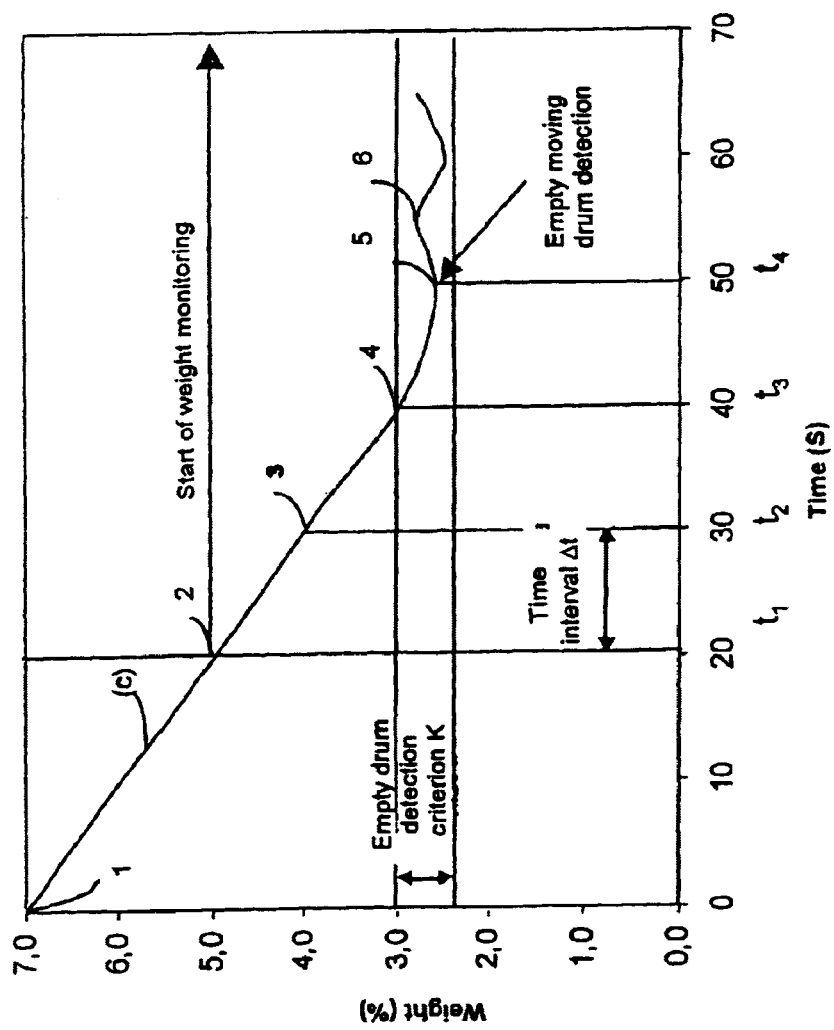
FIG. 1 illustrates a graphical representation of relative changes in container weight as a function of time, as per one embodiment of the current invention.

FIG. 1 shows a curve of the relative percentage change in the weight of liquid in the container (under a gas pressure as indicated above) as a function of time, which indicates that, at time t=0 7% of the initial weight of liquid in the container remains. On the left in the figure, the curve starts at a relative time t=0 with a weight value $P_0$ equal to 7% of the initial weight The draining curve C for the moving drum or shuttle drum (see FIG. 2) is a straight line that decreases uniformly according to the representation given in FIG. 1.

Transfer from the moving container 10 to the fixed container 24 (or the point of use if only a single container is used) is achieved here by the gas (for example helium) of electronic purity and low solubility in the liquid, which is at a sufficient pressure (usually several bar in order to be able, owing to the pressure, to make the chemical liquid rise up the dip tube 20 that extends as far as the bottom of the container and is often longer than the length needed to reach the bottom of the container, which allows this tube, that rests on the bottom of the container, to be angled. Preferably, the end cross section of the tube is beveled, the longest part of the bevel bearing on the bottom of the container, so as to better recover all the last amounts of liquid when the drum empties).

Because of the constant overpressure above the chemical liquid, very much greater than the pressure due to the height of the liquid in the container, there is therefore a virtually constant pressure at the end of the dip tube, which results in a curve (in FIG. 1) having a constant slope down to the point 4. This point 4 is representative of the time $t_3$ (in FIG. 1) at which the end of the dip tube is no longer entirely (completely) submerged in the liquid, which results in the propellant gas being sucked into the tube and therefore a smaller amount of chemical liquid transferred. Thus, curve C tends to decrease less quickly and at time $t_4$ of the next sampling it has not reached the point that it ought to have reached if the curve C had continued its linear decrease. According to the invention, the container must be considered as being empty after this time. According to the prior art, this level could not in general be determined accurately.

(The methods of the prior art, so as not to risk the line from the dip tube drying out, consists in general in setting the level of 5% of remaining product (set limit) as being the limit at which it will be necessary to change the container that contains the chemical liquid, which means that a not insignificant percentage (2 to 4%) of the liquid chemical product is thrown away, whereas according to the invention it is possible to use some of the chemical product that remains, while still avoiding any risk of the consumer drying out at the point of use).

Starting from point 1 at time t=0, point 2 on the curve is reached after a time $t_1$ at which it is arbitrarily decided to start the procedure of monitoring the contents of the moving drum. This procedure could be started right from the time t=0 according to a preferred method of implementing the invention, but it may also in some cases be desirable to start when $P_i$ simply reaches a certain preset value. The $\Delta P_i$ value is then measured regularly using the balance, as will be explained later, either regularly (by preference) or randomly or in a controlled manner by the intervention of another parameter, by sampling at all the time intervals $\Delta t$. Point 3 on curve C is thus reached at time $t_2 = t_1 + \Delta t$, then point 4 on the curve is reached at time $t_3 = t_2 + \Delta t$ and point 5 on the curve is reached when the measurement demonstrates that the $\Delta P$ value is less than the value that might be expected if the previous uniformly decreasing slope of curve C had continued. This indicates (when ΔP is less than a value that will have been predetermined) that the drum is empty or practically empty and that it is therefore time to change it. Experience shows that the point of inflection 5 depends on the container, on the dip tube, etc. and that it is not possible to drop below a certain weight percentage that may vary depending on the circumstances according to the physical parameters of each container, of each dip tube, etc., but which is always unpredictable when the drum of chemical liquid is installed.

Figure 2:
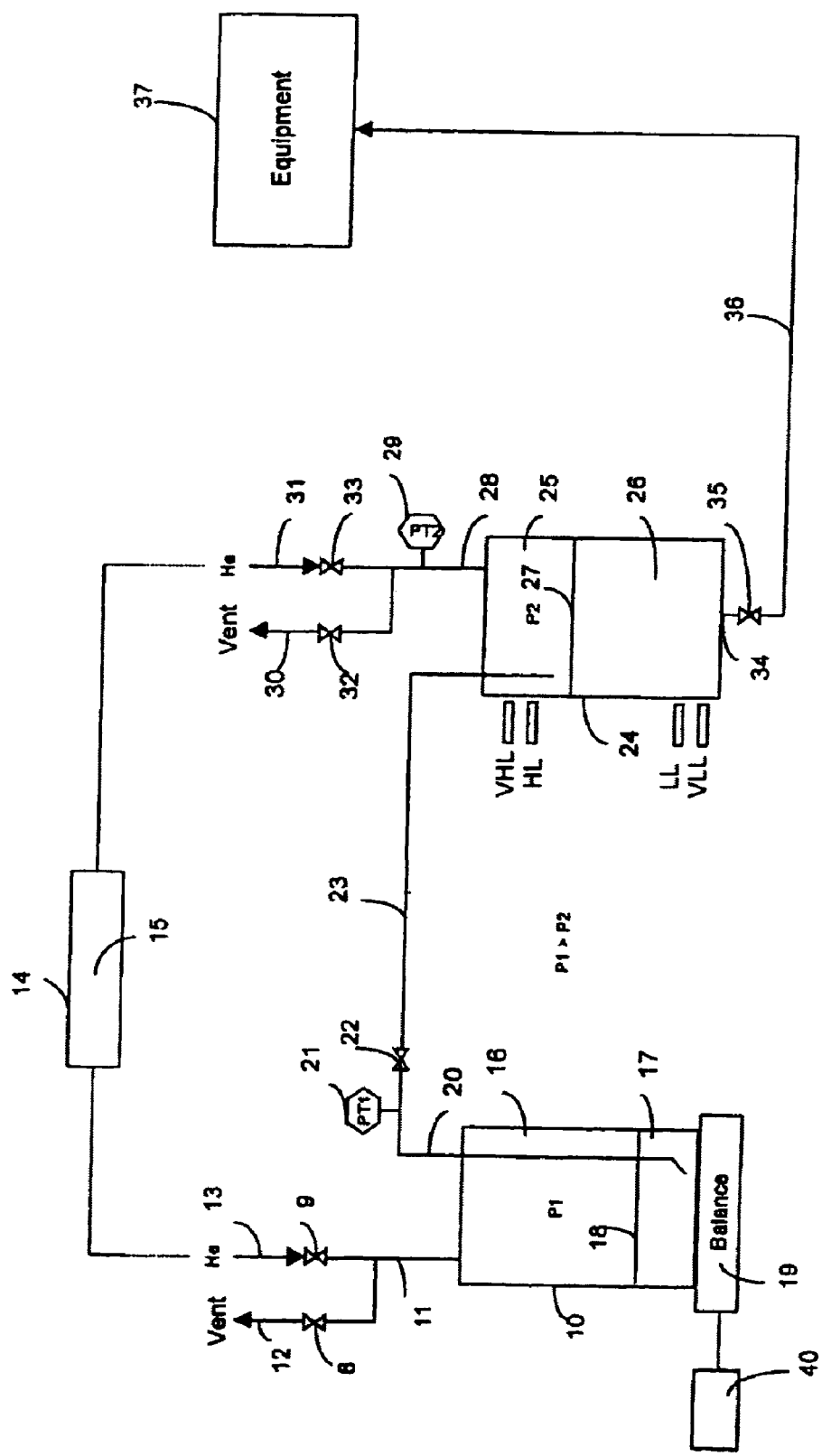
FIG. 2 illustrates a partial view of one embodiment of the current invention, highlighting an integrated-circuit fabrication reactor, a moving container intended to be changed when it is empty, and a fixed container which acts a buffer for the plant.

FIG. 2 shows an example of the implementation of the method according to the invention and of an implementation system in which the same elements as those of the other figures bear the same references. A moving drum 10 is connected by a line 11 via a valve 9 and then a line 13 to pressurized gas container means, preferably the gas being an inert gas and more particularly helium when nitrogen for example and/or argon react with the liquid chemical product (helium has the advantage of being completely inert with practically all products). This helium gas 15 is contained in a tank 14 which is itself connected via the line 31, the valve 33 and the line 28 to the fixed drum 24. Beneath the moving drum 10 there is a balance with weight measuring means 40, while in the moving drum, at the bottom thereof, there is the liquid chemical product into which the tube 20 is immersed in order to move the product and send it to the fixed drum 24, above the surface 18 of which liquid chemical product there is the inert gas 16 under pressure $P_1$ which thus pressurizes the liquid chemical product so as to allow it to be transferred to the fixed drum 24. Also connected onto the line 11, via a valve 8, is a line 12 serving as a vent, thus allowing the pressure of the inert gas 16 to be controlled. A pressure sensor 21 is used to measure the pressure $P_1$ in the container 10, in the line 20 going from the moving container 10 through the valve 22 and then the line 23 that allows the fixed drum 24 to be recharged with liquid chemical product when the latter has reached its low level LL or its very low level VLL. Filling the fixed drum 24 allows the level of liquid chemical product 26 to rise from its low level LL or very low level VLL to its high level HL or its very high level VHL, while maintaining the inert gas, such as helium, in the upper part 25 of the fixed container 24. Connected to the line 28 is a pressure sensor 29 for measuring the pressure $P_2$ inside the fixed drum 24 and a branch line 30 and a valve 32 acting as vent so as to control the pressure $P_2$ inside the fixed drum 24.

At the base of the fixed drum 24 there is a line 34 followed by a valve 35 and a line 36, all allowing the liquid chemical product to be delivered to the equipment 37. In operation, it will always be preferable to maintain the pressure $P_1$ in the moving drum above the pressure $P_2$ in the fixed drum (high-level and low-level detection safety redundancy). The operation of the system illustrated in FIG. 2 will be described below, under normal running conditions. In this case, the product is delivered by pressurizing the fixed drum 24; the filling of the fixed drum is triggered when the low level LL is reached. The product is transferred from the moving drum 10, without thereby interrupting the delivery via the line 34, the valve 35 and the line 36 to the equipment. The filling of the fixed drum 24 stops automatically as soon as the level HL is reached. It should be noted that the levels VLL and VHL are not used as detection levels for normal operation, but only as alarm levels requiring a particular emergency stop or emergency filling procedure.

If the moving drum 10 no longer contains enough product to fill the fixed drum when filling is underway, the system for detecting the end of the moving drum 10, as explained with regard to FIG. 1, makes it possible to trigger the operation of changing the moving drum. In order to detect this end of the moving drum, two parameters that can be modified by the operator may be used for this purpose: the time interval Δt between, for example, times $t_1$ and $t_2$, or $t_2$ and $t_3$, etc. (see FIG. 1) and the weight change $\Delta P_i$ between two set times, it being possible for this weight change to be either an absolute change $\Delta P_i$ or relative change $\Delta P_i/P$ (expressed, as above, as a percentage of the initial weight), the operator having prerecorded, in the measurement and control system 40 of the balance, the minimum threshold value that the parameter $\Delta P_i$ or the parameter $\Delta P_i/P$ must not reach, detection of the value going below this level making it possible to generate an alarm signal, such as a display, a siren, etc.

According to a variant of the invention, it is possible to provide a parameter-settable (for example 5%) threshold prealarm system relating to the parameter $\Delta P_i/P$. When this change becomes less than 5%, the attention of the operator is drawn once again by a prealarm or a presiren, etc. Preferably, the amount of product contained in the moving drum is displayed on a screen of the system 40 at all times. It may be expressed in units of weight and/or units of volume and/or as a percentage. The empty drum detection method may use whatever weight-derived unit, including that mentioned above. In practice, it is preferable to use the measurement expressed as a percentage: in this situation the time interval Δt is typically 10 to 30 seconds and the weight change criterion is typically 0.5% (absolute value). The empty drum detection method also makes it possible to monitor the relative change in weight over the interval Δt. Of course, in this case, the weight change ΔP criterion must be adapted. In general, if an absolute or relative liquid weight change is monitored, the weight of the moving drum 10 is not directly involved in the measurement and must simply be subtracted. It will be assumed as a general rule that the weight of the empty drum is always the same, especially when the absolute value variable is used.

Of course, the system described in FIG. 2 may be applicable in the case in which there are several fixed drums and a system of several moving drums, each moving drum having to be equipped with a weight measuring system as described in FIG. 2. Thus, the system described in this FIG. 2 makes it possible to overcome problems of drift in the balance and of the force exerted by the pipework for connecting the delivery system to the moving drum, which may significantly disturb a measurement that has to be accurate when the drum empties.

Figure 3:
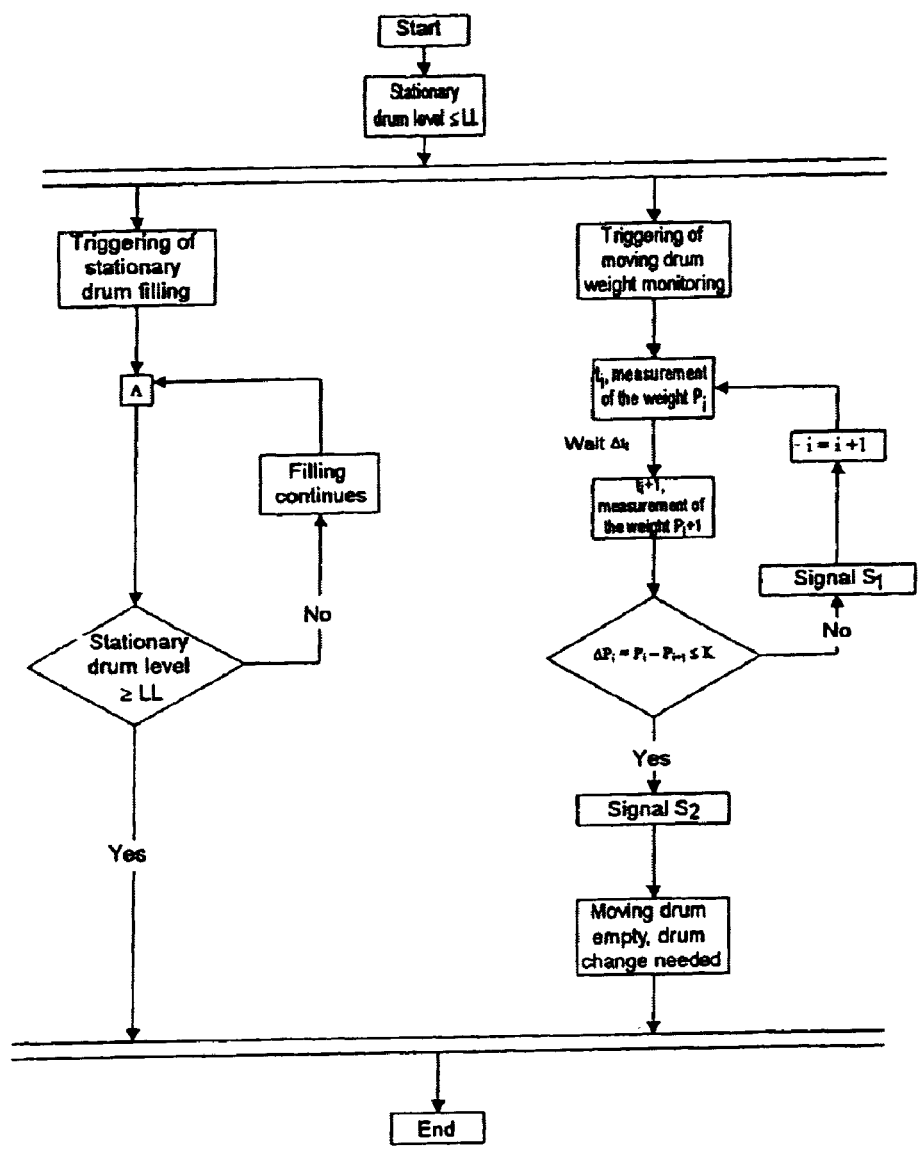
FIG. 3 illustrates an example of an operating flow chart in accordance with an illustrative embodiment of the current invention.

FIG. 3 illustrates an example of a flowchart for the operation of the apparatus and for the method according to the invention, which explains itself.

Of course other operating systems are possible and this one is given merely by way of indication.

At time $t=t_0$ corresponding to the detection of the low level LL in the fixed drum, the filling of the fixed drum and the monitoring of the liquid weight in the moving drum are started simultaneously, as described by the present invention. Until the high liquid level HL in the fixed drum is detected, the filling continues (the loop passing through point A in FIG. 3), as does the monitoring of the weight in the moving drum. After several loops (as explained below) the situation is as at time $t=t_i$. The first operation is to store the weight $P_i$ remaining in the moving drum. This operation is repeated at time $t_{i+1}=t_i+\Delta t$ when the remaining weight $P_{i+1}$ is also stored. The weight change $\Delta P_i=P_i-P_{i+1}$ during the time interval $\Delta t_i$ is calculated and compared with a predetermined value K. A signal $S_1$ is generated if $\Delta P_i>K$ during the time interval $\Delta t_i$ (moving drum available), in which case the weight monitoring is continued according to the loop shown in FIG. 3 (iteration i=i+1). A signal $S_2$ is generated if $\Delta P_i \leq K$ during this same time interval $\Delta t_i$ (moving drum empty).

A comparison is then made between $t_i$ and $t_m$ ($t_m$ being a preprogrammed end-of-operations time). If $t_i<t_m$, $t_i$ is replaced with $t_{i+1}$ in the loop and the procedure is restarted. Otherwise, the operation is terminated. It goes without saying that the values of $\Delta t_i$ and K are predetermined, that is to say chosen in advance by the user.

EXAMPLE

The following example illustrates the method of the invention on the basis of the following data:
moving drum containing about 20 liters of product when it is full;
low level LL detection in a fixed drum when 22.5% of product remains in the moving drum;
pressure gradient between the two drums: 0.5 bar;
time intervals $\Delta t_i$=15 seconds;
empty drum detection criterion: weight change <0.5% during $\Delta t_i$; and
the values of the weight of liquid remaining in the moving drum are given in the table below:

| Time (seconds) | Weight (%) |
|---|---|
| 0 | 22.5 |
| 15 | 21.0 |
| 30 | 19.6 |
| 45 | 18.1 |
| 60 | 16.4 |
| 75 | 15.0 |
| 90 | 13.5 |
| 105 | 12.1 |
| 120 | 10.4 |
| 135 | 8.5 |
| 150 | 7.3 |
| 165 | 5.8 |
| 180 | 4.1 |
| 195 | 2.7 |
| 210 | 1.2 |
| 225 | 1.0* |

*Empty drum detection at t = 225 seconds.
NB: The balance still indicates the presence of 1.0% of product remaining in the moving drum when the latter is declared empty. This shows the cumulative effect of the relative accuracy of the balance and of the force caused by the pipework for connection to the moving drum, which force tends to increase the apparent weight of the moving drum: however, the above example shows that these two effects in no way counter the reliability of the empty drum detection according to the method of the invention.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for measuring and inducing flow in a liquid, said method comprising:
    a) measuring the amount of a liquid in a container, wherein said measuring further comprises measuring a weight, $P_i$, of said liquid in said container at a time $t_i$, wherein:
        1) said i ranges from 0 to n, this measurement being repeated at time $t_{i+1}$, then at time $t_{i+2}$, until time $t_n$;
        2) n is an integer greater than about 3;
        3) the weight change $\Delta P_i = P_i - P_{i+1}$ of said liquid ranges from times $t_i$ and $t_{i+1}$; and
        4) $\Delta t = t_{i-1} - t_i$, is also measured so as to generate at time $t_n$ a signal, S indicating that the container may be considered empty when $\Delta P_i$ is less than a predetermined fraction F of the weight of the container and/or of the liquid initially contained in the latter; and
    b) making said liquid flow from said container to a point of use, said flow induced by a flow means.

2. The method according to claim 1, wherein said $\Delta P_i$ is triggered only when the value of the direct or indirect measurement of the weight of the container and/or of the liquid is less than or equal to a predetermined fraction F of the initial weight of the container and/or of the liquid contained in the container.

3. The method according to claim 2, wherein said predetermined fraction F is less than or optionally equal to about 10% of the initial weight of the container and/or of the liquid initially contained in the container.

4. The method according to claim 1, wherein said time interval $\Delta t_i = t_{i+1} - t_i$ ranges from two successive measurements of the weight of the container and/or of the liquid is predetermined.

5. The method according to claim 4, wherein said predetermined time interval is about ten seconds.

6. The method according to claim 1, wherein the flow of the liquid is at least partly caused by the pressure exerted by a pressurized gas lying above the surface of the liquid in the container; and wherein said gas is compatible with the liquid.

7. The method according to claim 6, wherein said gas is essentially inert with respect to the liquid to be propelled.

8. The method according to claim 6, wherein said liquid is sent to a second container before being sent to its point of use.

9. The method according to claim 6, wherein said gas is at least one component selected from the group consisting of:
    a) helium;
    b) neon;
    c) xenon;
    d) nitrogen;
    e) argon;
    f) krypton; and
    g) carbon dioxide.

10. The method according to claim 6, wherein said gas has a pressure from about $10^5$ to about $10^6$ pascals, or about 1 to about 10 bars.

11. An apparatus for delivering a liquid chemical product which comprises:
    a) a container;
    b) means for connecting said container to the point of use for said liquid;
    c) means for measuring the amount of said liquid in said container, which includes clock means;
    d) storage means;
    e) means for calculating the difference in the amount of liquid $\Delta P_i = P_i - P_{i+1}$ in the container between times $t_i$ and $t_{i+1}$;
    f) means for comparing $\Delta P_i$ with a predetermined value F; and
    g) means for generating a first signal $S_1$ if $\Delta P_i > F$ or a second signal $S_2$ if $\Delta P_i \leq F$;
    wherein said container contains the chemical liquid to be delivered;
    wherein said clock means generate, at successive times $t_i$, $t_{i+1}$, etc., a signal for triggering a measurement $P_i$, $P_{i+1}$, etc. of the amount of said chemical liquid at said times $t_i$, $t_{i+1}$, etc.; and
    wherein said storage means record the measurements $P_i$, $P_{i+1}$, etc. of the amount of said liquid at times $t_i$, $t_{i+1}$, etc. respectively.

* * * * *

UNITED STATES PATENT AND TRADEMARK OFFICE
CERTIFICATE OF CORRECTION

PATENT NO. : 6,920,401 B2
DATED : July 19, 2005
INVENTOR(S) : Guillaume Rameau and Pascal Mengolli It is certified that error appears in the above-identified patent and that said Letters Patent is hereby corrected as shown below:

<u>Column 7,</u>
Line 61, replace the variable "$t_{i+}$" with -- $t_{i+1}$ --.

Signed and Sealed this

Twenty-seventh Day of September, 2005

JON W. DUDAS
*Director of the United States Patent and Trademark Office*